US010424926B2

United States Patent
Fidigatti et al.

(10) Patent No.: US 10,424,926 B2
(45) Date of Patent: Sep. 24, 2019

(54) METHOD FOR CONTROLLING AN ELECTRIC POWER DISTRIBUTION MICRO-GRID

(71) Applicant: ABB S.p.A., Milan (IT)

(72) Inventors: Antonio Fidigatti, Spino d'Adda (IT); Enrico Ragaini, Bergamo (IT); Fabio Monachesi, Foligno (IT); Fabio D'Agostino, Camporosso (IT); Federico Silvestro, Genoa (IT)

(73) Assignee: ABB S.p.A., Milan (IT)

(*) Notice: Subject to any disclaimer, the term of this patent is extended or adjusted under 35 U.S.C. 154(b) by 0 days.

(21) Appl. No.: 15/831,877

(22) Filed: Dec. 5, 2017

(65) Prior Publication Data

US 2018/0159327 A1   Jun. 7, 2018

(30) Foreign Application Priority Data

Dec. 6, 2016 (EP) .................................... 16202531

(51) Int. Cl.
*H02J 3/14* (2006.01)
*H02J 3/38* (2006.01)

(52) U.S. Cl.
CPC .................. *H02J 3/14* (2013.01); *H02J 3/38* (2013.01); *H02J 3/381* (2013.01);
(Continued)

(58) Field of Classification Search
CPC ...... H02J 3/14; H02J 3/38; H02J 3/381; H02J 2003/388; Y02B 70/3225; Y04S 20/222
See application file for complete search history.

(56) References Cited

U.S. PATENT DOCUMENTS 4,216,384 A * 8/1980 Hurley ...................... H02J 3/14
  307/35
2007/0222294 A1* 9/2007 Tsukida .................... H02J 3/14
  307/29

(Continued)

FOREIGN PATENT DOCUMENTS

WO       2015003729 A1    1/2015
WO  WO-2015003729 A1 *  1/2015  ................ H02J 3/14

OTHER PUBLICATIONS

European Patent Office, Extended Search Report issued in corresponding Application No. 16202531.6, dated Jun. 8, 2017, 11 pp.
(Continued)

*Primary Examiner* — Thomas C Lee
*Assistant Examiner* — Michael Tang
(74) *Attorney, Agent, or Firm* — J. Bruce Schelkopf; Taft Stettinius & Hollister LLP

(57) ABSTRACT

Method for controlling an electric power distribution micro-grid, the micro-grid comprising: an electric coupling node that said micro-grid is electrically disconnectable from an electric power distribution main grid; one or more electric loads, each consuming a corresponding amount of electric power provided by the micro-grid, the electric loads including one or more disconnectable loads electrically disconnectable from the micro-grid; and at least an electric power source including one or more electric power generators. The method of controlling is carried out in response to the disconnection of the micro-grid from the main grid on a disconnection instant and comprises the following: determining whether the electric disconnection of the micro-grid from the main grid is due to a fault in the main grid; if it is determined that the disconnection of the micro-grid from the main grid is not due to a fault in the main grid, executing a load shedding procedure to disconnect in a selective manner one or more disconnectable loads; if it is determined that the
(Continued)

Figure 1:
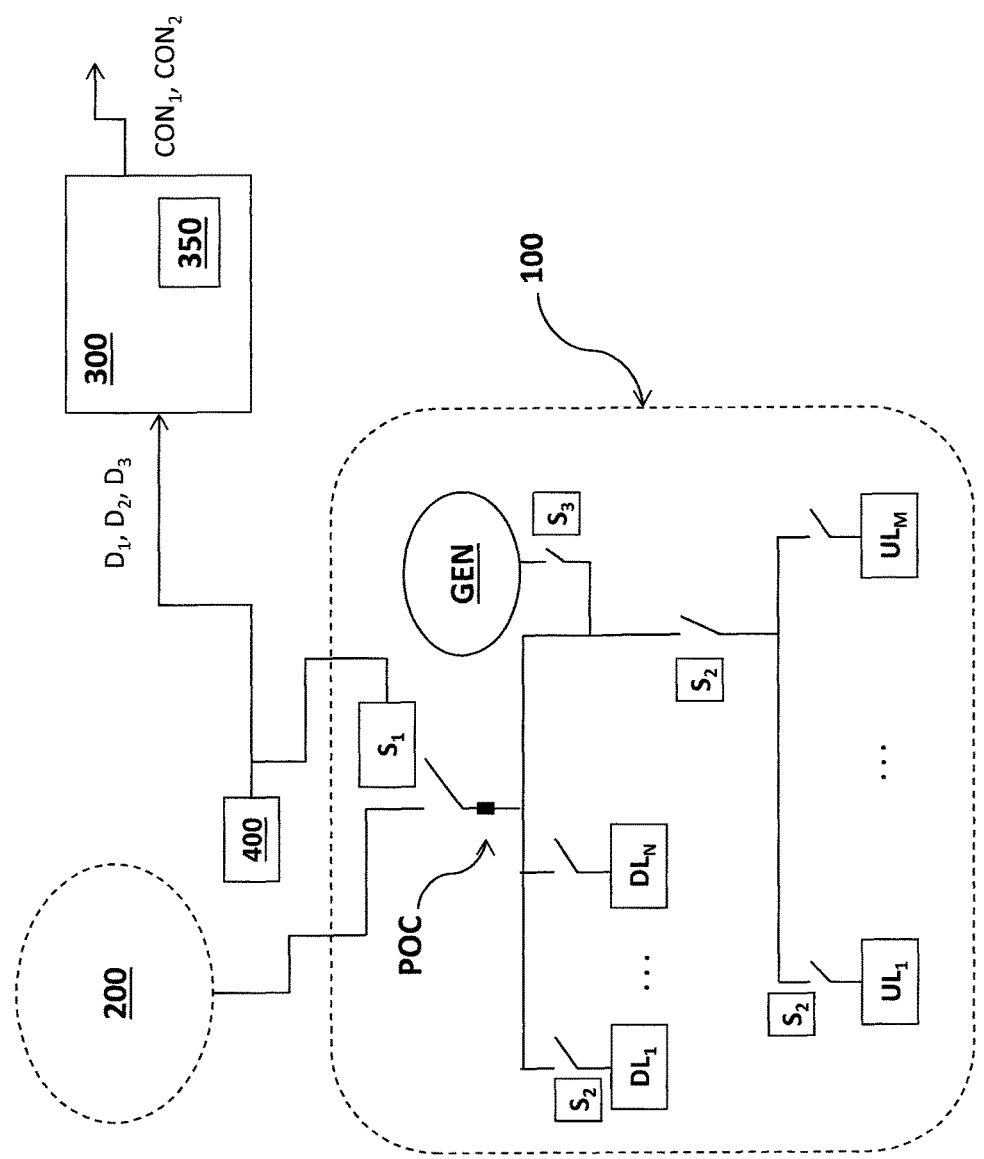
Figure 2:
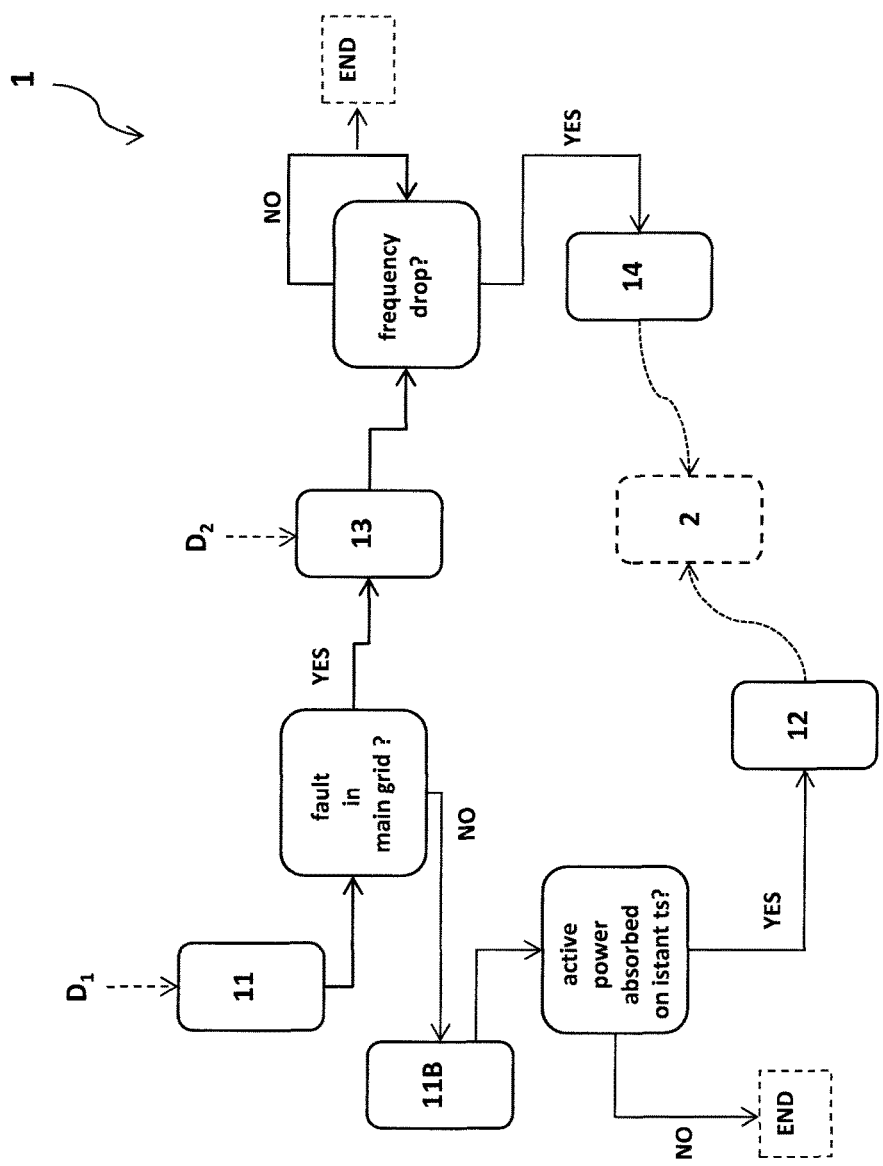
Figure 3:
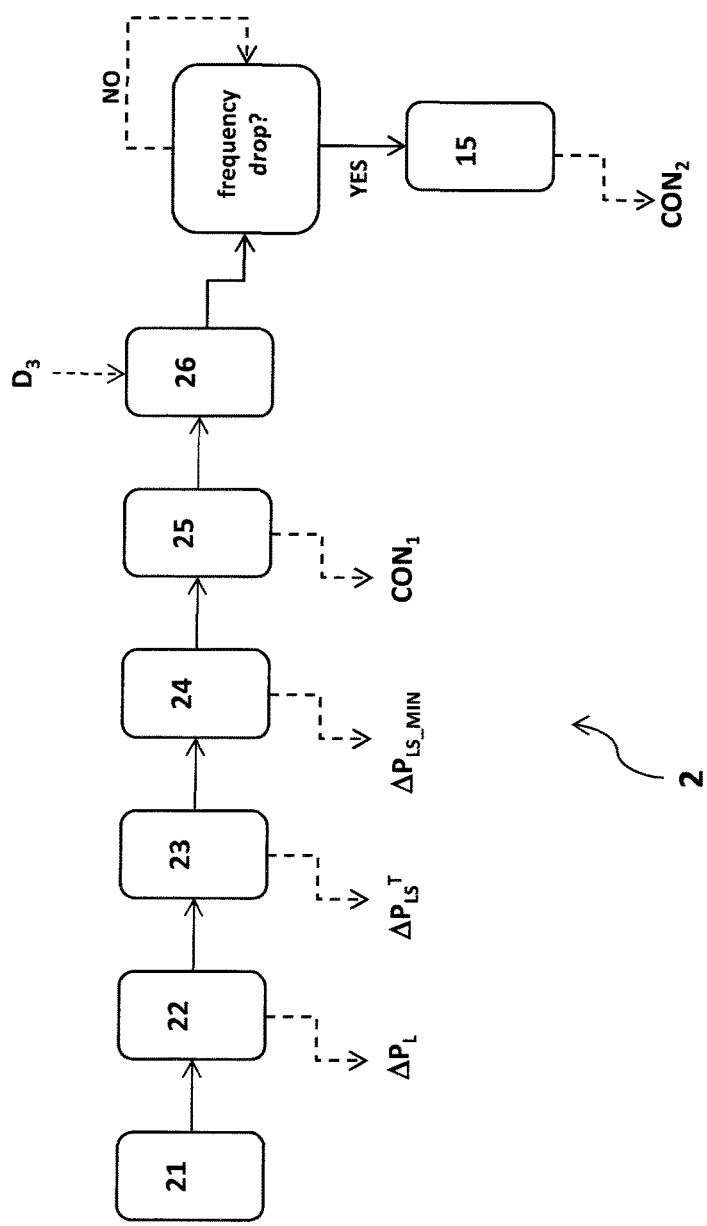

disconnection of the micro-grid from the main grid is due to a fault in the main grid, determining whether a drop of a frequency of the micro-grid is in progress following the disconnection of the micro-grid; and if a drop of frequency is in progress following the disconnection of the micro-grid from the main grid, executing the load shedding procedure.

18 Claims, 5 Drawing Sheets

(52) U.S. Cl.
CPC ..... *H02J 2003/388* (2013.01); *Y02B 70/3225* (2013.01); *Y04S 20/222* (2013.01)

(56) References Cited

U.S. PATENT DOCUMENTS

| | | | |
|---|---|---|---|
| 2012/0104847 A1* | 5/2012 | Roscoe | H02J 3/00 307/23 |
| 2012/0226386 A1* | 9/2012 | Kulathu | H02J 13/0079 700/295 |
| 2012/0283888 A1 | 11/2012 | Mao et al. | |
| 2012/0283890 A1* | 11/2012 | Fu | H02J 3/14 700/295 |
| 2014/0354234 A1* | 12/2014 | Sudan | H02J 7/0063 320/127 |
| 2016/0013650 A1* | 1/2016 | Bhowmik | H02J 3/381 307/69 |

OTHER PUBLICATIONS

Chandrasena, R. et al., "Operation and Control of Three Phase Microgrids Consisting of Single-Phase DERs," 2013 IEEE 8th International Conference on Industrial and Information Systems, ICIIS 2013, Aug. 18-20, 2013, Sri Lanka, pp. 599-604.

Roscoe, A. et al., "Increasing Security of Supply by the use of a Local Power Controller during Large System Disturbances," 2011 2nd IEEE PES International Conference and Exhibition on Innovative Smart Grid Technologies (ISGT Europe 2011), Manchester, United Kingdom, Dec. 5-7, 2011, pp. 1-7.

Zhang, H. et al., "A Novel Load Shedding Strategy for Distribution Systems with Distributed Generations," 2014 5th IEEE PES Innovative Smart Grid Technologies Europe (ISGT Europe), Oct. 12-15, 2014, Istanbul, pp. 1-6.

* cited by examiner

METHOD FOR CONTROLLING AN ELECTRIC POWER DISTRIBUTION MICRO-GRID

The present invention relates to the field of electric power distribution grids.

More particularly, the present invention relates to a method for controlling the operation of a micro-grid when this latter operates disconnected from the main grid.

As is known, in the field of electric power distribution grids, a micro-grid is commonly intended as an electric power distribution system arranged and confined in a clearly defined zone.

In addition to a variety of electric loads, a micro-grid normally includes a number of electric power generators, e.g. solar panel plants, wind turbine plants, combined heat and power systems, marine energy generation systems, geothermal or biomass energy generation systems, solar generation, diesel generation, fuel cells, and the like.

In order to provide reliable and stable electric power to critical electric loads, a micro-grid may include also a variety of energy storage units, e.g. as capacitor banks, batteries and the like. Normally, a micro-grid is electrically connected to a main grid, such as an electric power utility grid.

A micro-grid, when electrically connected to the main grid, is commonly referred to as operating in a "grid connected mode".

However, in response to system needs or abnormal conditions (e.g. faults or power outages in the main grid) or user's decision, a micro-grid may electrically disconnect (e.g. by means of suitably arranged circuit breakers) from the main grid and operate in a so-called "islanded mode".

As is known, frequency and voltage of a micro-grid are often subject to relevant transients when this latter operates in an islanded mode. This inconvenient generally occurs as micro-grids normally rely on the electric power provided by the larger main grids to ensure suitably balanced operational parameters.

Such voltage and frequency transients may rapidly lead (e.g. tens of ms) to black-out phenomena or malfunctions of the electric loads.

In addition, when a micro-grid disconnects from the main grid, the electric power generated by generators installed in the micro-grid may not be sufficient to supply all connected electrical loads.

For both reasons, several methods have been developed to control micro-grids.

Patent applications US2012283888A1 and US2012283890A1 disclose methods to control a micro-grid operating in islanded mode according to a power generation plan to be carried out in a given transition time after the electric disconnection from the main grid. Such power generation plan can be updated according to the needs.

Patent application WO2015003729A1 discloses a method for controlling a micro-grid during an operation transition from a grid connected mode to an islanded mode.

Currently available methods to control micro-grids operating disconnected from the main grid are generally complicated and difficult to carry out in practice.

Some currently available methods do not provide robust control solutions to stabilize the operation of a micro-grid.

Other available methods often lead to unnecessary disconnections of the electric loads, thus reducing the operational capabilities of the micro-grid more than required by its actual operation conditions.

In the market, it is still felt the demand for control solutions for micro-grids operating disconnected from the main grid, which can provide a robust and effective management of the electric power consumption by the electric loads of the micro-grid, thereby ensuring a suitable power balance with the available electric power generation sources and, at the same time, avoiding or reducing over-shedding interventions of said electric loads.

In order to respond to this need, the present invention provides a method for controlling an electric power distribution micro-grid, according to the following claim 1 and the related dependent claims.

In a further aspect, the present invention relates to a computer program, according to the following claim 10.

In a further aspect, the present invention relates to a computerised device, according to the following claim 11.

In a further aspect, the present invention relates to a control apparatus or device, according to the following claim 12.

Characteristics and advantages of the present invention shall emerge more clearly from the description of preferred but not exclusive embodiments illustrated purely by way of example and without limitation in the attached drawings, in which:

FIG. 1 schematically illustrates an electric power distribution micro-grid and a control apparatus thereof, according to the invention;

FIG. 2-5 are diagrams schematically illustrating the method, according to the invention.

With reference to the mentioned figures, the present invention relates to a method 1 for controlling the operation of a low or medium voltage electric power distribution micro-grid 100.

Within the framework of the present invention the term "low voltage" relates to operational voltages up to 1.2 kV AC and 1.5 kV DC whereas the term "medium voltage" relates to operational voltages higher than 1.2 kV AC and 1.5 kV DC up to several tens of kV, e.g. up to 72 kV AC and 100 kV DC.

The micro-grid 100 may be an electric power distribution network for industrial, commercial and residential buildings or plants. As an example, it may be characterised by an average power consumption comprised in the range between 0.05 MW and 10 MW.

The micro-grid 100 comprises an electric coupling node POC (Point Of Coupling), at which said micro-grid is electrically connectable with or disconnectable from an electric power distribution main grid 200.

The main grid 200 may be an extended electric power distribution network, such as for example electric power utility grid.

Normally, the micro-grid 100 is electrically connected with from the main grid 200 at the electric coupling node POC.

However, in some circumstances (e.g. in case of power outages or faults), the micro-grid 100 may electrically disconnect from the main grid 200 at the electric coupling node POC.

The micro-grid 100 preferably comprises at least a first switching device $S_1$ (e.g. a circuit breaker), the operation of which can be controlled in a known manner by means of suitable control signals.

When the switching device $S_1$ is in a closed (ON) state, the micro-grid 100 is electrically connected to the main grid 200 and conveniently operates according to a grid-connected mode. When the switching device $S_1$ is in an open (OFF) state, the micro-grid 100 is electrically disconnected from the main grid 200 at the electric coupling node POC and may operate in an islanded mode, as described in the following.

The micro-grid 100 comprises one or more electric loads $DL_1, \ldots, DL_N, UL_1, \ldots, UL_M$, each of which consumes a corresponding amount of electric power provided by the micro-grid 100. For the sake of clarity, it is here specified that, in the framework of the present invention, the term "consumption" should be intended in terms of average power consumption, instantaneous power consumption, energy consumption or other physical quantities equivalent to these latter. It is also specified that the term "power" may be referred to "active power", "reactive power" or "apparent power" according to the specific need.

The electric loads $DL_1, \ldots, DL_N, UL_1, \ldots, UL_M$ may be of any type, according to the needs. In general, an electric load $DL_1, \ldots, DL_N, UL_1, \ldots, UL_M$ may be any device adapted to consume an amount of electric power in operation.

As shown in FIG. 1, the electric loads $DL_1, \ldots, DL_N, UL_1, \ldots, UL_M$ may be arranged on different grid branches, according to a multi-level configuration. However, different configurations are possible.

In principle, the electric loads $DL_1, \ldots, DL_N, UL_1, \ldots, UL_M$ may be electrically connected with or disconnected from the micro-grid 100, according to the needs.

Conveniently, the micro-grid 100 comprises one or more second switching devices $S_2$ for electrically disconnecting or connecting one or more electric loads or one or more grid branches from or with the remaining portions of the micro-grid.

The second switching devices $S_2$ may include, for example, circuit breakers, contactors, I-O interfaces, switches, switch-disconnectors, communication interfaces or other similar devices. The operation of the switching devices $S_2$ can be controlled in a known manner by means of suitable control signals.

The electric loads of the micro-grid 100 include one or more disconnectable loads $DL_1, \ldots, DL_N$, which are electrically disconnectable from the micro-grid (in the real operation of this latter) by switching them off or by controlling corresponding second switching devices $S_2$.

The electric loads of the micro-grid 100 may also include one or more undisconnectable loads $UL_1, \ldots, UL_M$, which cannot be electrically disconnected (in the real operation of this latter) from the micro-grid by switching them off or by controlling corresponding second switching devices $S_2$.

For the sake of clarity, it is important to specify that a given electric load $DL_1, \ldots, DL_N, UL_1, \ldots, UL_M$ of the micro-grid 100 is considered as "disconnectable" or "undisconnectable" depending on the operation foreseen for said electric load in the micro-grid 100 and not depending on its specific structure or arrangement or possible operational modes.

As an example, a given electric load (e.g. an electric motor), which in principle might be electrically disconnected from the micro-grid 100 (e.g. by operating a suitable second switching device $S_2$), is considered as "undisconnectable" if it is not possible to intervene on it during the operation of the micro-grid 100, for example due to its critical role or function in the micro-grid 100.

As a further example, a given electric load, which is electrically connected in a permanent manner with the remaining portions of the micro-grid 100, may be considered as "disconnectable" if it can be switched on/off according to the needs, without specific requirements, during the operation of the micro-grid 100.

Conveniently, the disconnectable loads $DL_1, \ldots, DL_N$ of the micro-grid 100 are assigned with a priority level, which is a numerical value (index) indicative of the order with which said disconnectable loads have to be disconnected from the micro-grid 100, when required to do so. Conveniently, the priority level of each disconnectable load $DL_1, \ldots, DL_N$ may be defined by the user or be assigned dynamically by a suitable algorithm using the (nominal or measured) electric power consumption of said loads as reference index to sort the disconnectable loads, e.g. from lower to higher power consumption or according to other sorting logics. Disconnectable loads $DL_1, \ldots, DL_N$ having a same priority level may be ordered depending on their electric power consumption, as well.

The micro-grid 100 comprises an electric power source GEN including one or more electric power generators (not shown).

Said electric power generators may be of any type and arranged according to the needs.

As an example, they may comprise solar panel plants, wind turbine plants, combined heat and power systems, marine energy generation systems, solar generation, diesel generation, geothermal or biomass energy generation systems, fuel cells, and the like.

The electric power source GEN may comprise also one or more energy storage units, which may be of any type and arranged according to the needs. As an example, they may comprise capacitor banks, batteries and the like.

Advantageously, the micro-grid 100 comprises one or more third switching devices $S_3$ for electrically disconnecting or connecting said electric power generators (and possibly said energy storage units) from or with the remaining portions of the micro-grid.

The third switching devices $S_3$ may include, for example, circuit breakers, contactors, switch disconnectors or other similar devices.

The method 1, according to the invention, is suitable for managing the operation of the micro-grid 100, when this latter operates disconnected from the main grid.

The method 1, according to the invention, is thus conveniently carried out in response to the electric disconnection of the micro-grid 100 from the main grid 200 at the electric coupling node POC on a given disconnection instant ts.

In order to detect whether the micro-grid 100 is subject to an islanding event, the operation status of the switching device $S_1$ may be conveniently monitored.

Independently from the actual reasons causing the switching device $S_1$ to intervene (e.g. systems needs or faults or user's action), the tripping of the switching device $S_1$ in the OFF state constitutes the necessary and sufficient condition to cause the islanding of micro grid 100.

As soon as the switching device 1 trips in an OFF state at disconnection instant ts, the method 1 of the invention is conveniently executed to control the operation of the micro-grid 100.

According to the invention, the method 1 comprises the step 11 of determining whether the disconnection of the micro-grid 100 from the main grid 200 is due to a fault in the main grid 200, more particularly to a fault in the main grid 200 that is located nearby the common coupling node POC.

Preferably, the determination step 11 of the method 1 provides for observing the behaviour of some electric quantities detected at the electric coupling node POC on the disconnection instant ts.

Preferably, the determination step 11 of the method 1 comprises the step of acquiring first data $D_1$ related to the operation status of the micro-grid 100 on the disconnection instant ts.

Preferably, the first data $D_1$ comprise detection values indicative of the behaviour of electric quantities at the electric coupling node POC on the disconnection instant ts.

Preferably, the detection values included in the first data $D_1$ are provided by one or more detection devices 400 (e.g. voltage sensors, current sensors, and the like) arranged to detect said electric quantities at the electric coupling node POC.

The detection devices 400 may be of known type and are not described in further details for the sake of brevity.

Preferably, the detection data included in the first data $D_1$ comprise a grid voltage detection value $V_{GRID}$ indicative of the grid voltage of the micro-grid 100 at the electric coupling node POC on the disconnection instant ts.

Preferably, the determination step 11 of the method 1 comprises the step of comparing said grid voltage detection value (included in the first data $D_1$) with a voltage threshold value $V_{TH}$.

If said grid voltage detection value is higher than or equal to the voltage threshold value $V_{TH}$ {$V_{GRID}$>=$V_{TH}$}, the disconnection of the micro-grid 100 from the main grid 200 is not due to a fault in the main grid 200.

If the grid voltage detection value $V_{GRID}$ is lower than the voltage threshold value $V_{TH}$ {$V_{GRID}$<$V_{TH}$}, the disconnection of the micro-grid 100 from the main grid 200 is due to a fault in the main grid 200 (nearby the common coupling node POC).

The above described steps of checking the grid voltage $V_{GRID}$ at the electric coupling node POC on the disconnection instant ts find a technical ground in the observation that an electric node of an electric power distribution grid is generally subject to under-voltage phenomena in case of faults (e.g. short circuits) occurring in portions of the grid.

Therefore, the presence of an under-voltage phenomenon at the electric coupling node POC on the disconnection instant ts constitutes an unambiguous signature of a fault occurring nearby the electric coupling node POC, which causes the disconnection event of the micro-grid 100. Conveniently, the determination step 11 of the method 1 provides also for observing the grid current at the common coupling node POC on the disconnection instant ts.

Preferably, the detection data included in the first data $D_1$ comprise grid current detection values $I_{GRID}$ indicative of the grid current $I_{GRID}$ of the micro-grid 100 at the electric coupling node POC on the disconnection instant ts.

Preferably, the determination step 11 of the method 1 comprises the step of checking the direction of the grid current flowing through the electric coupling node POC on the disconnection instant ts based on said grid current detection values $I_{GRID}$.

It has been found that the above described steps of checking the direction of the grid current at the electric coupling node POC on the disconnection instant ts, as mentioned above, provides additional information in determining whether a fault occurred in the main grid 200 or whether the micro-grid was absorbing active electric power from the main grid.

Conveniently, the determination step 11 of the method 1 provides also for checking further information in addition to the detection values indicative of the electric quantities described above.

Preferably, the first data $D_1$ comprise log information indicative of the operation of the switching device $S_1$. Such log information may include, for example, information related to relay commands, interlocking commands, manual commands, status signals and the like received by the switching device $S_1$.

Preferably, the determination step 11 of the method 1 comprises the step of checking said log information.

The analysis of such log information has been found to be an effective solution to determine whether the disconnection of the micro-grid 100 from the main grid 200 is not due to a fault in the main grid 200 but to other reasons (e.g. to manual, system or interlocking commands received by the switching device $S_1$, power outages of the main grid 200, and the like).

According to the invention, if the disconnection of the micro-grid 100 from the main grid 200 is not due to a fault in said main grid, the method 1 further provides for checking (step 11B) whether the micro-grid 100 was absorbing active electric power from the main grid 200 on the disconnection instant ts (thereby globally operating as an electric load).

If the micro-grid 100 was absorbing active electric power from the main grid 200 on the disconnection instant ts, the method 1 comprises the step 12 of executing a load shedding procedure 2 to disconnect in a selective manner one or more of the disconnectable loads $DL_1, \ldots, DL_N$ of the micro-grid 100 in response to the islanding event at the disconnection instant ts. In fact, a flow of active power from the main grid 200 to the micro-grid 100 on the disconnection instant ts is indicative of the circumstance that the micro-grid 100 was not able to suitably feed all its electric loads on said disconnection instant. This means that a load shedding of said electric loads has to be performed even if no relevant faults are present in the main grid.

If the micro-grid 100 was not absorbing active electric power from the main grid 200 on the disconnection instant ts, the method 1 is terminated.

In fact, a flow of active power from the micro-grid 100 to the main grid 299 on the disconnection instant ts is indicative of the circumstance that the micro-grid 100 was able to suitably feed all its electric loads on said disconnection instant and was able to provide electric power to the main grid 200 (thereby globally operating as an electric generator).

The load shedding procedure 2 will be described in more details in the following.

According to the invention, if the disconnection of the micro-grid 100 from the main grid 200 is due to a fault in said main grid, the method 1 comprises the step 13 of determining whether a drop of the frequency of the micro-grid 10 is in progress following the disconnection of the micro-grid 100 from the main grid 200 at the disconnection instant ts.

Preferably, the step 13 of determining whether a drop of the frequency of the micro-grid 100 is in progress comprises the steps of acquiring second data $D_2$ related to the frequency of said micro-grid.

The second data $D_2$ may be provided by the detection devices 400 or other detection devices of known type.

Preferably, the second data $D_2$ include a first frequency detection value $F_1$, which is indicative of the frequency of the micro-grid 100, and a second frequency detection value $F_2$, which is indicative of the variation of frequency of said micro-grid over a certain amount of time (in practice of the derivative of the frequency of said micro-grid).

Preferably, the step 13 of determining whether a drop of the frequency of the micro-grid 100 is in progress comprises the step of comparing the first frequency detection value $F_1$ with a first frequency threshold value $F_{TH1}$ and the step of comparing the second frequency detection value $F_2$ with a second frequency threshold value $F_{TH2}$.

If the frequency detection values $F_1$ is lower the respective threshold values $F_{TH1}$ and the frequency detection values $F_2$ is higher the respective threshold values $F_{TH2}$ {$F_1$<$F_{TH1}$ AND $F_2$>$F_{TH2}$}, a drop of the frequency of the micro-grid 100 is in progress in response to the islanding event of said micro-grid at the disconnection instant ts.

The presence of a frequency drop in the micro-grid 100 operating disconnected from the main grid 100 means that there is no balance between the electric power provided by the electric power source GEN and the electric power consumed by the electric loads $DL_1, \ldots, DL_N, UL_1, \ldots, UL_M$.

In this case, the method 1 comprises the step 14 of executing the load shedding procedure 2 to disconnect in a selective manner one or more of the disconnectable loads $DL_1, \ldots, DL_N$.

On the other hand, the absence of a frequency drop in the micro-grid 100 means that there is a balance between the electric power provided by the electric power source GEN and the electric power consumed by the electric loads $DL_1, \ldots, DL_N, UL_1, \ldots, UL_M$.

In this case, the method 1 is in principle concluded.

Of course, the operational conditions of the micro-grid 100 may change in time, for example due to an increase (for any reasons) of the number of electric loads electrically connected in the micro-grid 100.

The step 13 of determining whether a drop of the frequency of the micro-grid 100 is in progress is thus preferably cyclically executed while the micro-grid 100 operates disconnected from the main grid 200

Preferably, if a frequency drop in the micro-grid 100 is determined at any time when the micro-grid 100 still operates in an islanded mode, the method 1 provides for executing the load shedding procedure 2 (according to the step 14 described above).

Figure 5:
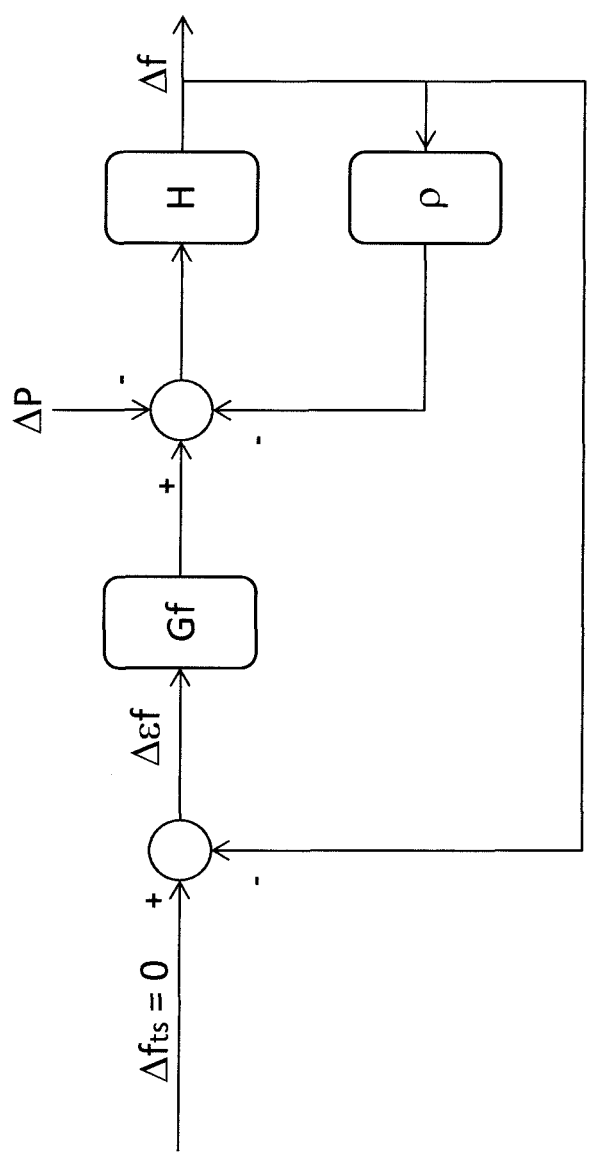

The above described steps of the method 1 find a technical ground in the observation that the micro-grid 100 operating in an islanded mode can be modelled according to the control scheme represented in FIG. 5.

The relationship between the variation of the frequency $\Delta f$ and the variation of available electric power $\Delta P$, which follows the islanding of the micro-grid 100 on the disconnection instant ts, can be modelled by the following transfer function:

$$\frac{\Delta f(s)}{\Delta P(s)} = -\frac{1}{G_f(s) + \rho + s \cdot 2H}$$

where $\Delta f$ is the frequency variation in the micro-grid compared with initial conditions, $\Delta P$ is the variation of available electric power (using load sign convention), $\Delta \varepsilon_f$ is a frequency error variation, $\Delta f_{ts}$ is a frequency error variation at the initial conditions, $G_f$ is a transfer function representing the electric power source in the micro-grid, $\rho$ is a damping factor of the micro-grid and $H$ is an inertia factor of the micro-grid.

The response of the micro-grid 100 in terms of frequency variation at the disconnection instant ts can be represented by the following relationship:

$$\left.\frac{df}{dt}\right|_{t=ts} = -\frac{\Delta P}{2H}$$

The frequency variation can thus be considered (in a rough approximation) as proportionally depending on the variation of available electric power in the micro-grid following the disconnection of the micro-grid 100.

The inventors have observed that if an under-voltage phenomenon is present at the electric coupling node POC on the disconnection instant ts (i.e. if the islanding of the micro-grid 100 is due a fault in the main grid 200 nearby the electric coupling node POC), any possible frequency variation $\Delta f$ evolves in time according to a relatively slow dynamic behavior (several tens of ms).

It is thus possible to check whether a frequency drop is actually in progress following the islanding event at the disconnection instant ts. If a frequency drop is in progress, the method 1 provides for executing the load shedding procedure 2 in order to protect the micro-grid 100.

If no under-voltage phenomena are present at the electric coupling node POC on the disconnection instant ts, there is no time to check whether a frequency drop actually occurs as any possible frequency variation $\Delta f$ evolves quite rapidly in time (few tens of ms) due to the fact that an under-voltage "relaxation" effect is not present.

In this case, the method 1 provides for immediately executing ("blind execution") the load shedding procedure 2 in order to protect the micro-grid 100.

The load shedding procedure 2 of the method 1 is now described in more details.

The load shedding procedure 2 comprises a step 21 of calculating a power disconnection value $\Delta P_L$ indicative of an amount of electric power, which is no more available for the electric loads $DL_1, \ldots, DL_N, UL_1, \ldots, UL_M$ of the micro-grid 100 following the disconnection of this latter from the main grid 200.

The total power variation due to disconnection $\Delta P_L$ may be calculated based on the following relation:

$$\Delta P_L = P_I + P_G - P_{IR}$$

where $P_I$ is a power consumption value indicative of the electric power provided by the main grid 200 to the micro-grid 100 before the islanding of this latter, $P_G$ is a power generation value indicative the electric power provided by the power generation systems (e.g. a photovoltaic plant) included in the electric power source GEN, $P_{IR}$ is a power reserve value indicative the electric power provided by a primary power reserve, e.g. electric energy storage units included in the electric power source GEN or other like.

Preferably, the power consumption value $P_I$ and the power storage value $P_{IR}$ are detected values that can be measured by means of suitably arranged detection devices of known type. Preferably, the power generation value $P_G$ is a calculated value, which, in case of a photovoltaic power generation plant ($P_G(t)=PPV(t)$), can be calculated through a mathematical model given by the following relation:

$$PPV(t) = P_N \cdot \frac{W_d}{W_0}$$

where $P_N$ is the nominal power provided by the photovoltaic plants, $W_d$ is a direct radiation value in clear sky condition and $W_0$ is a standard radiation value (e.g. equal to 1000 $W/m^2$). The direct radiation value $W_d$ (in clear sky condition) may be calculated using a suitable trigonometric function, which combines several geographical and temporal quantities:

$$W_d = W_d(\beta, \psi, \psi_s, \chi, d, t)$$

where β is the solar angle, ψ is the solar azimuth, ψs is the photovoltaic plant azimuth, χ is the photovoltaic tilt and d is the day of the year and t is the time of the day.

The direct radiation value $W_d$ (in clear sky condition) may be suitably corrected by weather correction factors to model the photovoltaic plant operating in any sky condition.

As an alternative, the power generation value PPV may be a detection value measured on the field or an estimation value calculated by means of a suitable estimation mathematical models. The load shedding procedure 2 comprises a step 22 of calculating a power shedding target value $\Delta P_{LS}{}^T$ indicative of a target amount of electric power consumed by the electric loads $DL_1, \ldots, DL_N, UL_1, \ldots, UL_M$, which has to be shedding to stop the drop of frequency in progress. Conveniently, the power shedding target value $\Delta P_{LS}{}^T$ is calculated based on the calculated power disconnection value $\Delta P_L$ by means of a suitable algorithm, so that:

$$\Delta P_{LS}{}^T = f(\Delta P_L)$$

The load shedding procedure 2 comprises a step 22 of calculating a power shedding target value $\Delta P_{LS}{}^T$ indicative of a target amount of electric power consumed by the electric loads $DL_1, \ldots, DL_N, UL_1, \ldots, UL_M$, which has to be shedding to stop the drop of frequency in progress. Conveniently, the power shedding target value $\Delta P_{LS}{}^T$ is calculated based on the calculated power disconnection value $\Delta P_L$ by means of a suitable algorithm, so that:

$$\Delta P_{LS}{}^T = = f(\Delta P_L)$$

As an example, the function $f(\Delta P_L)$ may be calculated by means of an artificial neural network, trained with a set of simulation results or real measurements.

As a further example, the function $f(\Delta P_L)$ may be a linear function having the following form:

$$f(\Delta P_L) = C(\theta) \cdot \Delta P_L$$

where $C(\theta)$ is a polynomial function of parameters $\theta_1$ collected in $\theta = [\theta_1, \theta_2, \theta_3 \ldots \theta_m]$, which includes technical parameters of the grid (generators, cables, loads, etc.) and algorithm setup parameter including the maximum frequency deviation, recovery time, rate of change of frequency requirements, stability requirements, and the like.

For example, $C(\theta)$ can have the following expression:

$$C(\theta) = \sum_{\substack{j_1,j_2,\ldots,j_m=0,1,\ldots,v \\ j_1+j_2+\ldots+j_m=v}} c_{(j_1,j_2,\ldots,j_m)} \theta_1^{j_1} \cdot \theta_2^{j_2} \cdot \ldots \cdot \theta_m^{j_m}$$

where $j_i$ are integer numbers, $C_{(j_1, j_2, \ldots, j_m)}$ are real coefficients, m is the number of parameters, □ is the order of the polynomial.

The load shedding procedure 2 comprises a step 23 of calculating an electric power consumption map M, in which a cumulative amount $\Delta P_{LS}$ of electric power, which is consumed by the disconnectable loads $DL_1, \ldots, DL_N$, is expressed as a function of a priority level i assigned to said disconnectable loads.

Figure 4:
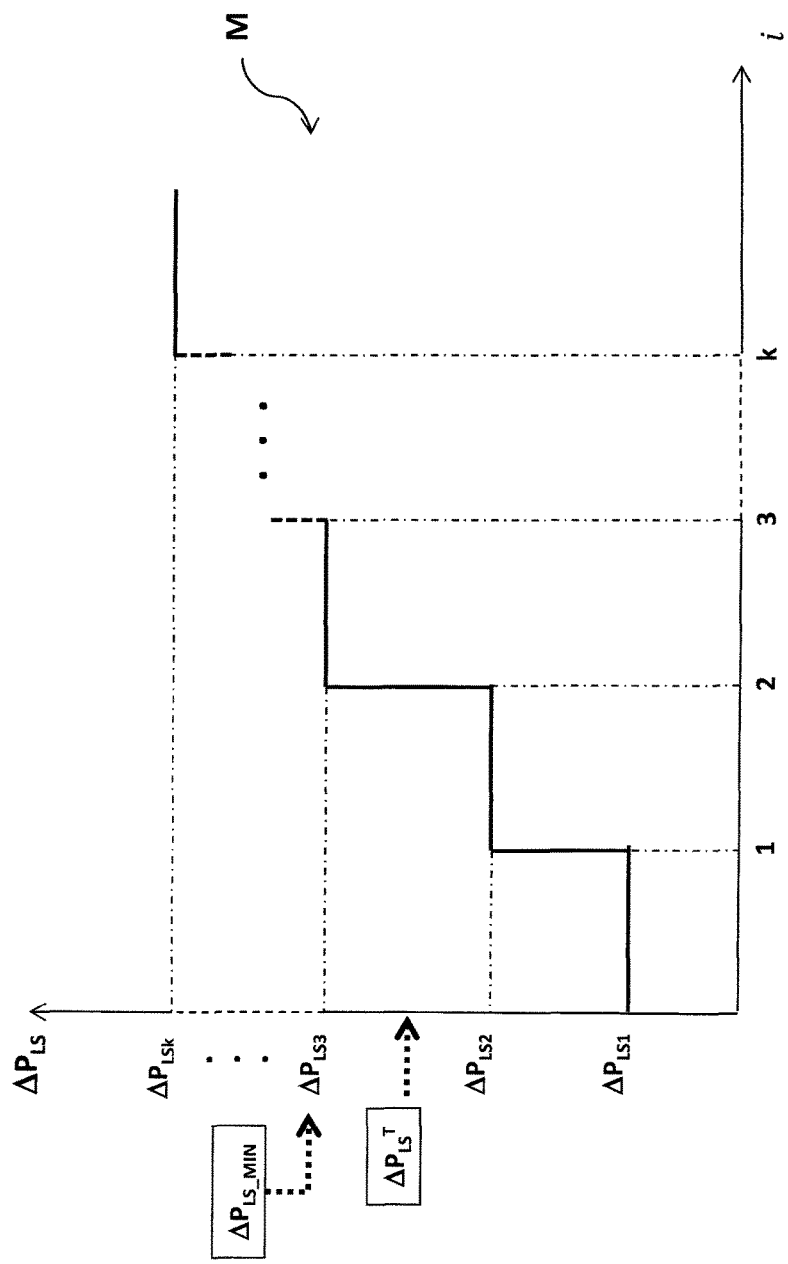

An example of electric power consumption map M is shown in FIG. 4.

Ordinate axis values $\Delta P_{LS1}, \ldots, \Delta P_{LSk}$ represent cumulative amounts of electric power consumed by the disconnectable loads $DL_1, \ldots, DL_N$ having a priority level i equal or lower than the corresponding x-axis values in the abscissa axis.

A generic value $\Delta P_{LSi}$ related to a corresponding priority value i is given by the following relation:

$$\Delta P_{Si} = \sum_j P_{j,i}$$

where i is the priority, j is the index of the disconnectable loads, $P_{j,i}$ is the power consumption of the disconnectable load j having priority i.

In a load shedding perspective, the above generic value $\Delta P_{LSi}$ related to a corresponding priority value i represents the cumulative amount of electric power that can be shedding by disconnecting the disconnectable loads $DL_1, \ldots, DL_N$, which have a priority level i equal or lower than the corresponding x-axis values in the abscissa axis, from the micro-grid 100.

In general, the cumulative value $\Delta P_{LSk}$, which represents the overall amount of electric power consumed by the disconnectable loads $DL_1, \ldots, DL_k$, is given by the following relation:

$$\Delta P_{LSk} = \sum_{i=1}^{k} \Delta P_{Si}$$

In a load shedding perspective, the above cumulative value $\Delta P_{LSk}$ represents the overall amount of electric power that can be shedding by disconnecting the disconnectable loads having priority level i lower or equal than k, $DL_1, \ldots, DL_k$ from the micro-grid 100.

In general, in the electric power consumption map M, the power shedding target value $\Delta P_{LS}{}^T$ calculated above falls in the ordinate axis between two subsequent cumulative values $\Delta P_{LSi}, \Delta P_{LSi+1}$ with $1 <= i <= N$, where i is the priority level.

In the example of FIG. 4, the power shedding target value $\Delta P_{LS}{}^T$ falls in the ordinate axis between two subsequent cumulative values $\Delta P_{LS2}, \Delta P_{LS3}$.

The load shedding procedure 2 comprises a step 24 of determining, by means of the electric power consumption map M, a power shedding minimum value $\Delta P_{LS\_MIN}$ indicative of a minimum amount of electric power consumed by the disconnectable loads $DL_1, \ldots, DL_N$, which has to be shedding to obtain the above calculated power shedding target value $\Delta P_{LS}{}^T$.

Conveniently, the mentioned power shedding minimum value $\Delta P_{LS\_MIN}$ is one of the cumulative values $\Delta P_{LS1}, \ldots \Delta P_{LSN}$ in the electric power consumption map M.

The mentioned power shedding minimum value $\Delta P_{LS\_MIN}$ corresponds to a shedding priority value i in the electric power consumption map M.

The shedding priority value $i_S$ is thus indicative of the minimum priority level for which the disconnectable loads $DL_1, \ldots, DL_N$ have to be shedding to obtain the above calculated power shedding target value $\Delta P_{LS}{}^T$.

In the example shown in FIG. 4, the mentioned power shedding minimum value $\Delta P_{LS\_MIN}$ is equal to the cumulative value $\Delta P_{LS3}$ in the electric power consumption map M. The shedding priority value $i_S=3$ is the priority value corresponding to the cumulative value $\Delta P_{LS\_MIN}=\Delta P_{LS3}$. Preferably, the power shedding minimum value $\Delta P_{LS\_MIN}$ is determined as the minimum cumulative amount $\Delta P_{LS}$, in the electric power consumption map M, for which the following relation is true:

$$\Delta P_{LS} >= m^* \Delta P_{LS}{}^T$$

where $\Delta P_{LS\_T}$ is the calculated power shedding target value and m is a number comprised between 0 and 1 (i.e. $0 \leq m \leq 1$).

The load shedding procedure 2 comprises a step 25 of providing first control signals $CON_1$ to electrically disconnect the disconnectable loads $DL_1, \ldots, DL_N$ of the micro-grid 100, which are assigned with a priority level i lower or equal than the determined shedding priority value $i_S$. Conveniently, the control signals COM are provided to the switching devices $S_2$ (e.g. circuit breakers, contactors, I-O interfaces, communication interfaces, and the like) corresponding to the disconnectable loads $DL_1, \ldots, DL_N$ to be disconnected from the other portions of the micro-grid 100.

The load shedding procedure 2 comprises a step 26 of determining whether a drop of the frequency of the micro-grid 100 is still in progress following the provision of the first control signals $CON_1$.

The determination step 26 of the load shedding procedure 2 is particularly important as it allows checking whether the shedding intervention on one or more disconnectable load has been effective in restoring a balance between the electric power provided by the electric power source GEN and the electric power consumed by the electric loads $DL_1, \ldots, DL_N, UL_1, \ldots, UL_M$.

Preferably, the step 26 of determining whether a drop of the frequency of the micro-grid 100 is still in progress comprises the steps of acquiring third data $D_3$ related to the frequency of said micro-grid.

The third data $D_3$ may be provided by the detection devices 400 or other detection devices of known type.

Preferably, the third data $D_3$ include a third frequency detection value $F_3$, which is indicative of the frequency of the micro-grid 100.

Preferably, the step 26 of determining whether a drop of the frequency of the micro-grid 100 is still in progress comprises the step of comparing the third frequency detection value $F_3$ with a third frequency threshold value $F_{TH3}$.

If the third frequency detection value $F_3$ is lower the respective threshold value $F_{TH3}$, $-\{F_3 < F_{TH3}\}$, a drop of the frequency of the micro-grid 100 is still in progress in response to the provision of the control signals $CON_1$.

Preferably, the step 26 of determining whether a drop of the frequency of the micro-grid 100 is still in progress comprises the steps of acquiring fourth data $D_4$ related to the frequency of said micro-grid.

The fourth data $D_4$ may be provided by the detection devices 400 or other detection devices of known type.

Preferably, the fourth data $D_4$ include a fourth frequency detection value $F_4$, which is indicative of the variation of frequency of said micro-grid over time (in practice of the derivative of the frequency of said micro-grid).

Preferably, the step 26 of determining whether a drop of the frequency of the micro-grid 100 is still in progress comprises the step of comparing the fourth frequency detection value $F_4$ with a fourth frequency threshold value $F_{TH4}$.

If the fourth frequency detection values $F_4$ is lower the respective threshold value4 $F_{TH4}$, $-\{F_4 < F_{TH4}\}$, a drop of the frequency of the micro-grid 100 is still in progress in response to the provision of the control signals $CON_1$.

The presence of a frequency drop in the micro-grid 100 after the provision of the control signals $CON_1$ means that the shedding intervention provided by the previous steps 21-25 of the load shedding procedure 2 has been not effective and that there is still no balance between the electric power provided by the electric power source GEN and the electric power consumed by the electric loads $DL_1, \ldots, DL_N, UL_1, \ldots, UL_M$.

In this case, the load shedding procedure 2 comprises the step 27 of providing second control signals $CON_2$ to electrically disconnect all the disconnectable loads $DL_1, \ldots, DL_N$ of the micro-grid 100.

Conveniently, the control signals $CON_2$ are provided to the switching devices $S_2$ (e.g. circuit breakers, contactors, I-O interfaces, communication interfaces, and the like) corresponding to all remaining disconnectable loads $DL_1, \ldots, DL_N$ to disconnect these latter from the other portions of the micro-grid 100.

The above mentioned step 27 of the load shedding procedure 2 finds its technical ground in the circumstance that if a frequency drop is still in progress, there is no time to repeat the steps 22-25 of the load shedding procedure 2 as the frequency is changing quite rapidly in time. Such a step of the load shedding procedure 2 thus ensures a robust control of the consumption of micro-grid 100 to protect this latter.

If a frequency drop in the micro-grid 100 is no more in progress after the provision of the control signals $CON_1$, this means that the shedding intervention provided by the previous steps 21-25 of the load shedding procedure 2 has been effective and that there is a balance between the electric power provided by the electric power source GEN and the electric power consumed by the electric loads $DL_1, \ldots, DL_N, UL_1, \ldots, UL_M$.

In this case, the load shedding procedure 2 (and the method 1) is in principle concluded. Of course, the operational conditions of the micro-grid 100 may change in time, for example due to an increase (for any reasons) of the number of electric loads electrically connected in the micro-grid 100.

The step 26 of determining whether a drop of the frequency of the micro-grid 100 is in progress is thus preferably cyclically executed while the micro-grid 100 operates disconnected from the main grid.

If a frequency drop in the micro-grid is determined at any time when the micro-grid 100 operates in an islanded mode, the method 1 provides for executing the shedding step 27 described above.

The method 1, according to the invention, is particularly to be implemented by a computerised device 300.

In a further aspect, the present invention thus relates to a computer program 350 comprising software instructions to carry out the method, according to the invention.

The computer program 350 is stored or storable in a storage medium, e.g. in a memory of the computerised device 300 (FIG. 1).

In a further aspect, the present invention further relates to a computerised device 300 comprising computerised resources (e.g. one or more microprocessors) configured to execute software instructions to carry out the method, according to the invention.

The computerised device 300 may be a computerised device installed on the field or in a remote location with respect to the electric power distribution micro-grid 100.

As an example, the computerised device 300 may be a control and protection unit installed on board a switching device, or a digital relay for electric power distribution grids or a controller. A typical processing time for the execution of the method according to the invention may be around 20 ms.

In a further aspect, the present invention, relates also to a control apparatus or device including hardware and software resources configured to implement the method 1, according to the invention.

As an example, the control apparatus or device may comprise a computerised device 300 provided with processing resources configured to execute software instructions to carry out the method, according to the invention.

The control apparatus or device may be arranged according to various control architectures, e.g. centralized architectures or multi-level architectures.

The method, according to the present invention, is quite effective in managing the power consumption of a micro-grid, when this latter operates disconnected from the main grid, maintain a balance between the power demand of the electric loads and the power availability provided by the electric power source of the micro-grid.

This ensures a robust control of the operation of the micro-grid and, at the same time, allows avoiding or reducing unnecessary over-shedding interventions on the electric loads.

The method, according to the present invention, is particularly adapted to be implemented by various control architectures, according to the needs, for example centralised, multi-level or distributed control architectures.

The method, according to the present invention, is particularly adapted to be implemented using the hardware and software resources that are already installed on the field to manage the operational of the electric power distribution grid.

The method, according to the invention, is particularly adapted for being implemented in digitally enabled power distribution networks (smart grids, micro-grids and the like).

The method, according to the invention, is of relatively easy and cost-effective practical implementation on the field.

The invention claimed is:

1. A method for controlling an electric power distribution micro-grid, said micro-grid comprising: an electric coupling node-(POC), at which said micro-grid is electrically connectable with or disconnectable from an electric power distribution main grid; one or more electric loads ($DL_1, \ldots, DL_N, UL_1, \ldots, UL_M$), each consuming a corresponding amount of electric power provided by said micro-grid, said electric loads including one or more disconnectable loads ($DL_1, \ldots, DL_N$) electrically disconnectable from said micro-grid; an electric power source (GEN)-including one or more electric power generators; wherein said method is executable in response to an electric disconnection of said micro-grid from said main grid at said electric coupling node on a disconnection instant (ts);

said method comprises the following steps:
- determining whether the disconnection of said micro-grid from said main grid is due to a fault in said main grid;
- if the disconnection of said micro-grid from said main grid is not due to a fault in said main grid and said micro-grid was absorbing active electric power from said main grid on said disconnection instant (ts), executing a load shedding procedure to disconnect in a selective manner one or more disconnectable loads ($DL_1, \ldots, DL_N$)—from said micro-grid;
- if the disconnection of said micro-grid from said main grid is due to a fault in said main grid, determining whether a drop of a frequency of said micro-grid is in progress following the disconnection of said micro-grid;
- if a drop of frequency is in progress following the disconnection of said micro-grid from said main grid, executing said load shedding procedure;

wherein said load shedding procedure comprises the following steps:
- calculating a power disconnection value ($\Delta P_L$) indicative of an amount of electric power, which is no more available for the electric loads ($DL_1, \ldots, DL_N, UL_1, \ldots, UL_M$) of said micro-grid following the disconnection of said micro-grid from said main grid;
- calculating a power shedding target value ($\Delta P_{LS}^T$) indicative of a target amount of electric power consumed by said electric loads ($DL_1, \ldots, DL_N, UL_1, \ldots, UL_M$), which has to be shed;
- calculating an electric power consumption map (M), in which a cumulative amount ($\Delta P_{LS}$) of electric power consumed by said disconnectable loads ($DL_1, \ldots, DL_N$) is expressed as a function of a priority level assigned to said disconnectable loads;
- determining by means of said electric power consumption map (M) a power shedding minimum value ($\Delta P_{LS\_MIN}$) indicative of a minimum amount of electric power consumed by said disconnectable loads ($DL_1, \ldots, DL_N$), which has to be shedded to obtain said power shedding target value ($\Delta P_{LS}^T$), said power shedding minimum value corresponding to a shedding priority value (is) in said electric power consumption map (M);
- providing first control signals ($CON_1$) to electrically disconnect the disconnectable loads ($DL_1, \ldots, DL_N$) assigned with a priority level (i)-lower or equal than said shedding priority value (is).

2. The method, according to claim 1, wherein said load shedding procedure comprises the following steps:
- determining whether a drop of the frequency of said micro-grid is still in progress following the provision of said first control signals ($CON_1$);
- if a drop of the frequency is still in progress, providing second control signals ($CON_2$) to electrically disconnect all the disconnectable loads ($DL_1, \ldots, DL_N$) of said micro-grid.

3. The method according to claim 1, wherein said step of determining whether the disconnection of said micro-grid from said main grid is due to a fault in said main grid comprises the following steps:
- acquiring first data ($D_1$) related to the operation status of said micro-grid on said disconnection instant (ts), said first data including detection values indicative of the behaviour of electric quantities ($V_{GRID}, I_{GRID}$) at said electric coupling node (POC) on said disconnection instant (ts);
- comparing a grid voltage detection value ($V_{GRID}$) included in said first data ($D_1$), which is indicative of a grid voltage of said micro-grid at said electric coupling node (POC) with a voltage threshold value ($V_{TH}$).

4. The method, according to claim 3, wherein said step of determining whether the disconnection of said micro-grid from said main grid is due to a fault in said main grid comprises the step of checking the direction of a grid current ($I_{GRID}$) flowing through said coupling node (POC) on said disconnection instant (ts) based on grid current detection values indicative of said grid current ($I_{GRID}$), said current detection values being included in said first data ($D_1$).

5. The method according to claim 3, wherein said step of determining whether the disconnection of said micro-grid from said main grid is due to a fault in said main grid comprises the step of checking log information indicative of the operation of a switching device ($S_1$), said switching device being capable of electrically disconnecting said micro-grid from said main grid at said electric coupling node (POC), said log information being included in said first data ($D_1$).

6. The method according to claim 1, wherein said step of determining whether a drop of the frequency of said micro-grid is in progress following the disconnection of said micro-grid from said main grid comprises the following steps:
- acquiring the second data ($D_2$) related to the frequency of said micro-grid, said second data including a first frequency detection value ($F_1$), which is indicative of the frequency of said micro-grid, and a second frequency detection value ($F_2$), which is indicative of the variation of frequency of said micro-grid over time;
- comparing said first frequency detection value ($F_1$) with a first frequency threshold value ($F_{TH1}$);
- comparing said second frequency detection value ($F_2$) with a second frequency threshold value ($F_{TH2}$).

7. The method, according to claim 2, wherein said step of determining whether a drop of the frequency of said micro-grid is still in progress following the provision of said first control signals ($CON_1$) comprises the following steps:
- acquiring third data ($D_3$) related to the frequency of said micro-grid, said third data including a third frequency detection value ($F_3$), which is indicative of the frequency of said micro-grid;
- comparing said third frequency detection value ($F_3$) with a third frequency threshold value ($F_{TH3}$).

8. The method according to claim 2, wherein said step of determining whether a drop of the frequency of said micro-grid is still in progress following the provision of said first control signals ($CON_1$) comprises the following steps:
- acquiring fourth data ($D_4$) related to the frequency of said micro-grid, said fourth data including a fourth frequency detection value ($F_4$), which is indicative of the variation of the frequency of said micro-grid over time;
- comparing said fourth frequency detection value ($F_4$) with a fourth frequency threshold value ($F_{TH4}$).

9. The method according to claim 1, wherein said power shedding minimum value ($\Delta P_{LS\_MIN}$) is determined as the minimum cumulative amount ($\Delta P_{LS}$) of electric power in said electric power consumption map (M) for which the following relation is true:

$$\Delta P_{LS} >= m * \Delta P_{LS}^T$$

where $\Delta P_{LS}^T$ is said power shedding target value and m is a predetermined number for which $0 <= m <= 1$.

10. A non-transitory computer readable storage medium readable by a data processing resource comprising:
- instructions stored on the non-transitory computer readable storage medium and executable by the data processing resource effective to:
  - operate an electric power distribution micro-grid, said micro-grid comprising: an electric coupling node (POC), at which said micro-grid is electrically connectable with or disconnectable from an electric power distribution main grid, one or more electric loads ($DL_1, \ldots, DL_N, UL_1, \ldots, UL_M$), each consuming a corresponding amount of electric power provided by said micro-grid, said electric loads including one or more disconnectable loads ($DL_1, \ldots, DL_N$) electrically disconnectable from said micro-grid, and an electric power source (GEN) including one or more electric power generators,
  - in response to an electric disconnection of said micro-grid from said main grid at said electric coupling node on a disconnection instant, determining whether the disconnection of said micro-grid from said main grid is due to a fault in said main grid,
  - if the disconnection of said micro-grid from said main grid is not due to a fault in said main grid and said micro-grid was absorbing active electric power from said main grid on said disconnection instant (ts), executing a load shedding procedure to disconnect in a selective manner one or more disconnectable loads ($DL_1, \ldots, DL_N$) from said micro-grid,
  - if the disconnection of said micro-grid from said main grid is due to a fault in said main grid, determining whether a drop of a frequency of said micro-grid is in progress following the disconnection of said micro-grid, and
  - if a drop of frequency is in progress following the disconnection of said micro-grid from said main grid, executing said load shedding procedure,
- wherein said load shedding procedure comprises the following steps:
  - calculating a power disconnection value ($\Delta P_L$) indicative of an amount of electric power, which is no more available for the electric loads ($DL_1, \ldots, DL_N, UL_1, \ldots, UL_M$) of said micro-grid following the disconnection of said micro-grid from said main grid,
  - calculating a power shedding target value ($\Delta P_{LS}^T$) indicative of a target amount of electric power consumed by said electric loads ($DL_1, \ldots, DL_N, UL_1, \ldots, UL_M$), which has to be shed,
  - calculating an electric power consumption map (M), in which a cumulative amount ($\Delta P_{LS}$) of electric power consumed by said disconnectable loads ($DL_1, \ldots, DL_N$) is expressed as a function of a priority level assigned to said disconnectable loads,
  - determining by means of said electric power consumption map (M) a power shedding minimum value ($\Delta P_{LS\_MIN}$) indicative of a minimum amount of electric power consumed by said disconnectable loads ($DL_1, \ldots, DL_N$), which has to be shedded to obtain said power shedding target value ($\Delta P_{LS}^T$), said power shedding minimum value corresponding to a shedding priority value (is) in said electric power consumption map (M), and
  - providing first control signals ($CON_1$) to electrically disconnect the disconnectable loads ($DL_1, \ldots, DL_N$) assigned with a priority level (i) lower or equal than said shedding priority value (is).

11. The method according to claim 2, wherein said step of determining whether the disconnection of said micro-grid from said main grid is due to a fault in said main grid comprises the following steps:
- acquiring first data ($D_1$) related to the operation status of said micro-grid on said disconnection instant (ts), said first data including detection values indicative of the behaviour of electric quantities ($V_{GRID}, I_{GRID}$) at said electric coupling node (POC) on said disconnection instant (ts);
- comparing a grid voltage detection value ($V_{GRID}$) included in said first data-($D_1$), which is indicative of a grid voltage of said micro-grid at said electric coupling node (POC) with a voltage threshold value ($V_{TH}$).

12. The method, according to claim 11, wherein said step of determining whether the disconnection of said micro-grid from said main grid is due to a fault in said main grid comprises the step of checking the direction of a grid current ($I_{GRID}$) flowing through said coupling node (POC) on said disconnection instant (ts) based on grid current detection values indicative of said grid current ($I_{GRID}$), said current detection values being included in said first data ($D_1$).

13. The method according to claim 4, wherein said step of determining whether the disconnection of said micro-grid from said main grid is due to a fault in said main grid comprises the step of checking log information indicative of the operation of a switching device ($S_1$), said switching device being capable of electrically disconnecting said micro-grid from said main grid at said electric coupling node (POC), said log information being included in said first data ($D_1$).

14. The method according to claim 12, wherein said step of determining whether the disconnection of said micro-grid from said main grid is due to a fault in said main grid comprises the step of checking log information indicative of the operation of a switching device ($S_1$), said switching device being capable of electrically disconnecting said micro-grid from said main grid at said electric coupling node (POC), said log information being included in said first data ($D_1$).

15. The method according to claim 2, wherein said step of determining whether a drop of the frequency of said micro-grid is in progress following the disconnection of said micro-grid from said main grid comprises the following steps:
  acquiring third data ($D_3$) related to the frequency of said micro-grid, said third data including a first frequency detection value ($F_1$), which is indicative of the frequency of said micro-grid, and a second frequency detection value ($F_2$), which is indicative of the variation of frequency of said micro-grid over time;
  comparing said first frequency detection value ($F_1$) with a first frequency threshold value ($F_{TH1}$);
  comparing said second frequency detection value ($F_2$) with a second frequency threshold value ($F_{TH2}$).

16. The method according to claim 2, wherein said step of determining whether a drop of the frequency of said micro-grid is still in progress following the provision of said first control signals ($CON_1$) comprises the following steps:
  acquiring fourth data ($D_4$) related to the frequency of said micro-grid, said fourth data including a fourth frequency detection value ($F_4$), which is indicative of the variation of the frequency of said micro-grid over time;
  comparing said fourth frequency detection value ($F_4$) with a fourth frequency threshold value ($F_{TH4}$).

17. The method according to claim 2, wherein said power shedding minimum value ($\Delta P_{LS\_MIN}$) is determined as the minimum cumulative amount ($\Delta P_{LS}$) of electric power in said electric power consumption map (M) for which the following relation is true:

$$\Delta P_{LS} >= m * \Delta P_{LS}^T$$

where $\Delta P_{LS}^T$ is said power shedding target value and m is a predetermined number for which $0<=m<=1$.

18. A system comprising:
an electric power distribution micro-grid comprising:
  an electric coupling node(POC), at which said micro-grid is electrically connectable with or disconnectable from an electric power distribution main grid,
  one or more electric loads ($DL_1, \ldots, DL_N$, $UL_1, \ldots, UL_M$), each consuming a corresponding amount of electric power provided by said micro-grid, said electric loads including one or more disconnectable loads ($DL_1, \ldots, DL_N$) electrically disconnectable from said micro-grid, and
  an electric power source (GEN) including one or more electric power generators; and
a computing device comprising a memory structured to store instructions and a data processing resource structured to execute the stored instructions effective to:
  in response to an electric disconnection of said micro-grid from said main grid at said electric coupling node on a disconnection instant, determine whether the disconnection of said micro-grid from said main grid is due to a fault in said main grid,
  if the disconnection of said micro-grid from said main grid is not due to a fault in said main grid and said micro-grid was absorbing active electric power from said main grid on said disconnection instant (ts), execute a load shedding procedure to disconnect in a selective manner one or more disconnectable loads ($DL_1, \ldots, DL_N$) from said micro-grid,
  if the disconnection of said micro-grid from said main grid is due to a fault in said main grid, determine whether a drop of a frequency of said micro-grid is in progress following the disconnection of said micro-grid, and
  if a drop of frequency is in progress following the disconnection of said micro-grid from said main grid, execute said load shedding procedure;
wherein said load shedding procedure comprises:
  calculating a power disconnection value ($\Delta P_L$) indicative of an amount of electric power, which is no more available for the electric loads ($DL_1, \ldots, DL_N$, $UL_1, \ldots, UL_M$) of said micro-grid following the disconnection of said micro-grid from said main grid,
  calculating a power shedding target value ($\Delta P_{LS}^T$) indicative of a target amount of electric power consumed by said electric loads ($DL_1, \ldots, DL_N$, $UL_1, \ldots, UL_M$), which has to be shed,
  calculating an electric power consumption map (M), in which a cumulative amount ($\Delta P_{LS}$) of electric power consumed by said disconnectable loads ($DL_1, \ldots, DL_N$) is expressed as a function of a priority level assigned to said disconnectable loads,
  determining by means of said electric power consumption map (M) a power shedding minimum value ($\Delta P_{LS\_MIN}$) indicative of a minimum amount of electric power consumed by said disconnectable loads ($DL_1, \ldots, DL_N$), which has to be shedded to obtain said power shedding target value ($\Delta P_{LS}^T$), said power shedding minimum value corresponding to a shedding priority value (is) in said electric power consumption map (M), and
  providing first control signals ($CON_1$) to electrically disconnect the disconnectable loads ($DL_1, \ldots, DL_N$) assigned with a priority level (i) lower or equal than said shedding priority value (is).

* * * * *